US012638197B2

(12) United States Patent
Li

(10) Patent No.: US 12,638,197 B2
(45) Date of Patent: May 26, 2026

(54) ENERGY-SAVING AIR CONDITIONER CONVERTED FROM GREEN ENERGY

(71) Applicant: Szu Cheng Ma, Taoyuan City (TW)

(72) Inventor: Huan Pien Li, Taoyuan City (TW)

(73) Assignee: Szu Cheng Ma, Taoyuan City (TW)

( * ) Notice: Subject to any disclaimer, the term of this patent is extended or adjusted under 35 U.S.C. 154(b) by 109 days.

(21) Appl. No.: 18/675,966

(22) Filed: May 28, 2024

(65) Prior Publication Data

US 2025/0369636 A1     Dec. 4, 2025

(51) Int. Cl.
| | |
|---|---|
| *F24F 5/00* | (2006.01) |
| *F24S 10/70* | (2018.01) |
| *F24S 60/30* | (2018.01) |
| *H02S 10/10* | (2014.01) |
| *H02S 40/44* | (2014.01) |

(52) U.S. Cl.
CPC ............ *F24F 5/0046* (2013.01); *F24S 10/70* (2018.05); *F24S 60/30* (2018.05); *H02S 10/10* (2014.12); *H02S 40/44* (2014.12); *F24F 2005/0067* (2013.01)

(58) Field of Classification Search
CPC .. F24F 5/0046; F24F 2005/0067; F24S 10/70; F24S 60/30
See application file for complete search history.

(56) References Cited

U.S. PATENT DOCUMENTS

| | | | | |
|---|---|---|---|---|
| 8,978,386 B2* | 3/2015 | Sekiai | ..................... | F02C 6/18 |
| | | | | 60/726 |
| 2005/0120715 A1* | 6/2005 | Labrador | .................. | F03G 7/00 |
| | | | | 60/618 |
| 2011/0023476 A1* | 2/2011 | Havel | ...................... | F01K 3/00 |
| | | | | 60/407 |

* cited by examiner

*Primary Examiner* — Lionel Nouketcha
(74) *Attorney, Agent, or Firm* — Birch, Stewart, Kolasch & Birch, LLP

(57) ABSTRACT

An energy-saving air conditioner converted from green energy, comprising: a light and heat composite energy-collecting corrugated panel, arranged on a building, having a corrugated panel and a plurality of solar cells on the surface of the corrugated panel for converting solar energy into electrical energy and storing it in a solar power supply system to provide a first electrical energy, and the bottom of the corrugated panel is provided with a plurality of heat collecting tubes for collecting hot air. And further uses light energy and thermal energy to complement and multiply each other, so that the first electrical energy can further generate a second electrical energy. No matter during the day or night, one can enjoy new green energy and energy-saving air conditioners.

6 Claims, 16 Drawing Sheets

90(90c)

110

120

ENERGY-SAVING AIR CONDITIONER CONVERTED FROM GREEN ENERGY

BACKGROUND OF THE INVENTION

1. Field of the Invention

The invention relates to an energy-saving air conditioner, especially an energy-saving air conditioner that uses "light energy" and "thermal energy" to complement and multiply each other, so that the first electrical energy can further generate a second electrical energy. No matter during the day or night, one can enjoy new green energy and energy-saving air conditioners.

2. Description of the Related Art

The term "Net Zero" comes from the Paris Agreement. In order to reduce the risks and impacts of climate change, the goal of the Paris Agreement is to "keep the rise in global surface temperature to well below 2° C.", and states that preferably the limit of the increase should only be 1.5° C. "At present, more than 130 2025-net-zero countries around the world have declared to achieve net-zero carbon emission goals, which is intended to decrease the impact of global warming.

Taiwan patent No. TW201329405A discloses a solar power generation system, and more particularly to a hot water energy storage all-weather solar thermal power generation system. This type of power generation can be divided into direct illumination and collection illumination. The direct illumination system allows solar panels to directly illuminate the sun to generate electricity. The collecting illumination type first uses a concave mirror or a convex lens to focus and concentrate the sunlight to reduce the illumination range of the sunlight, and then the concentrated sunlight is irradiated to the solar panel to generate electricity. However, solar cells currently in common use have poor energy conversion efficiency, are expensive, and have high construction cost per unit of power. In addition, solar cells provide electricity when there is sunlight, so they cannot be powered at night or in rainy weather. Therefore, the solar cell can supply an average of less than 30% of the time per day, while the remaining 70% of the time still depends on the power supply of the traditional power plant. Although it can use energy storage such as lead-acid batteries or lithium-ion batteries, the price of electricity storage is expensive. For example, it takes about 4,000 NT dollar per kWh for lead-acid batteries and about 15,000 NT dollar for lithium-ion batteries. Therefore, such energy storage costs are still not acceptable to the market. Although solar cell power generation can reduce the dependence on traditional power sources such as petroleum and nuclear power, it still cannot reduce the demand for power generation capacity of traditional power plants.

Taiwan patent No. TW202108950A discloses a heat pump enhanced concentrated solar power generation system, and more particularly to a concentrated solar power (CSP for short) is a power generation system of a collector-type solar power plant. It uses reflectors or lenses and uses optical principles to focus a large area of sunlight into a relatively small light collection area to concentrate the solar energy. The light collection area on the generator is exposed to sunlight and the temperature rises. According to the principle of photothermal conversion, the solar energy is converted into thermal energy, and the thermal energy drives the generator through the heat engine to generate electricity.

A parabolic trough condenser consists of a parabolic reflector that concentrates reflected light onto a receiver at the focal line. The receiver is a tube placed directly above the center of the parabolic reflector, and the tube is filled with working fluid. The reflector tracks the sun along a single axis during the day, when it flows through the receiver, the working fluid is heated to over 250° C., which is then used as a heat source for the power generation system.

The dish system uses a large parabolic curved concentrating reflector to concentrate the incident sunlight at a focal point, a receiver arranged at the focal point captures the heat and converts it into a useful form, usually to be a concentrating dish reflector and a Stirling engine coupled in a Stirling dish system, sometimes a steam engine is also used, which generates rotational kinetic energy to drive a generator and converts it into electrical energy.

Most of the concentrated solar power currently on the market uses a steam turbine engine to drive a generator to generate electricity; however, the generated steam requires energy to be cooled. When water evaporates into steam, its volume will increase one thousand six hundred times. On the contrary, when steam condenses into water, its volume will also shrink one thousand six hundred times. In other words, when water evaporates into steam and steam condenses into water generate energy during this process, but conventional concentrated solar power generation systems do not fully utilize this energy and waste it in vain.

Taiwan patent No. TW202108950A intends to drive the piston engine through the positive pressure generated when water evaporates and the negative pressure generated when steam condenses into water during the power generation process, so as to greatly increase the power output; and to make full use of the water vapor condensed into water, during the process of heating the water, preheats the water to above 55° C. and then inputs it into the boiler for heating to create more steam more efficiently. The above features are disclosed in Taiwan Patent No. 201329405.

A heat pump is an equipment that uses Carnot's principle to transfer heat from a low-temperature heat source to an object whose temperature is higher than the ambient temperature, thereby obtaining heat. Simply put, a heat pump uses a small amount of electrical energy to drive a compressor to compress the refrigerant and uses the changes in the phase state of the refrigerant to generate a large amount of heat energy; when the refrigerant changes from liquid to gas in the system, it will absorb heat and change from gas to liquid, it will produce a heat dissipation effect; in this way, it can absorb heat and dissipate heat at the same time, thereby achieving the heating effect and discharging cold air at the same time. The heat in the air, plus the heat generated by the compressor, is transferred to the water for storage. From the perspective of the law of conservation of energy, the thermal energy in the water=the electrical energy input to the compressor+the thermal energy absorbed in the air, so it is much greater than 4-6 times the input power of the compressor. The heat pump water heater can be considered as an energy amplifier. It uses energy to drive the refrigerant in the compressor to absorb the inexhaustible heat energy in the air (mainly from the sun, so it can also be called atmospheric thermal solar water heater), which is very cost-effective.

Referring to FIG. 1, shows that using the thermal cycle principle of the compressor to achieve heat transfer, the air conditioner can be used to produce cold air and also discharge heated air. According to the law of conservation of energy, the energy of the discharged heated air (QH) will be equal to the electric energy (WE) input to the air conditioner plus the amount of heat absorbed from the air-conditioned room (QL). An air conditioner can be considered as a heat transfer device that moves heat energy from an air-conditioned room to the atmosphere, and this process of moving heat energy requires the help of electrical energy to occur. Just like the water pump, once is energized, it will send water from the tap water tank on the ground floor to the water tower on the top floor. It's just that the air conditioner moves invisible heat energy, so the scientific name of the air conditioner is also called "heat pump". It uses the thermal cycle principle of the compressor (Rankine cycle) to generate heat transfer. And it reaches QH=QL+WE>WE, which has economic benefits.

Therefore, how to use the natural resources of sunlight and heat, combined with the thermal cycle principle of "heat pump" to overcome the shortcomings of conventional solar power generation and achieve the goal of net zero emissions, is the goal of the present invention.

SUMMARY OF THE INVENTION

It is a primary objective of the present invention is to provide an energy-saving air conditioner, especially an energy-saving air conditioner that uses "light energy" and "thermal energy" to complement and multiply each other, so that the first electrical energy can further generate a second electrical energy. No matter during the day or night, one can enjoy new green energy and energy-saving air conditioners.

In order to achieve the above objectives, the energy-saving air conditioner converted from green energy of the present invention, comprising: a light and heat composite energy-collecting corrugated panel, arranged on a building, having a corrugated panel and a plurality of solar cells on the surface of the corrugated panel for converting solar energy into electrical energy and storing it in a solar power supply system to provide a first electrical energy, furthermore, the bottom of the corrugated panel is provided with a plurality of heat collecting tubes, the outer end of each heat collecting tube has an air inlet; a heated air collecting tube connected to the inner end of each heat collecting tube for collecting a first heat source formed by the heated air of each heat collecting tube; a heat pump, which is powered by the first electrical energy, having one end connected to the first heat source, and the other end sends the heated air to a heat exchanger to heat the water which stored in an underground thermal insulation hot water storage tank; a first water pump, which is powered by the first electrical energy, for delivering the hot water in the underground thermal insulation hot water storage tank to a DC heating steam nozzle, and the power required by the DC heating steam nozzle is provided by the first electrical energy; a steam turbine engine connected to the DC heating steam nozzle, is driven by steam to generate a second electrical energy; a vacuum venturi tube connected to the steam turbine engine with an input pipe, so that the residual steam generated by the steam turbine engine passes through the vacuum venturi tube and is sent to the atmosphere through an output pipe; an atomizer, which is powered by the first electrical energy, the atomizer is a closed container, the upper end of the atomizer is connected to the vacuum venturi tube to generate a vacuum force, and the other end is provided with an air input pipe to introduce external air into the atomizer; a second water pump, which is powered by the first electrical energy, for supplying an external water source into the atomizer through a first water pipe for atomization, and a second water pipe, after entering the internal circulation of the atomizer, produces a cold water flow out, then forming a vacuum atomization refrigeration heat exchanger.

Also, the heat collecting tube is composed of the tube body arranged at the bottom of the corrugated panel.

Also, the building is a livestock breeding house, and the light and heat composite energy-collecting corrugated panel is installed on the roof of the livestock breeding house.

Also, the heat pump can also provide a second heat source at night by an auxiliary heat source generating device, the auxiliary heat source generating device includes: a hot spring geothermal heat, a residual heat from a diesel generator, a recycled ocean plastic compressed fuel strip, and a power grid off-peak power storage.

Also, the second electrical energy is provided for an electric device, the electric device includes: an electricity selling grid, a green air conditioner, an electrical apparatus, an electric pump electric energy, and a water drawing for desert farming.

Also, the external water source supplied by the second water pump includes a desert groundwater or a water storage tank.

Also, the vacuum atomization refrigeration heat exchanger atomizes the input water into fine molecules in the atomizer by using the external air, and uses the vacuum venturi tube to generate vacuum force on the atomizer to make a low temperature zone, whereby the second water pipe enters the atomizer circulation and forms a cold water flow out.

wherein the light and heat composite energy-collecting corrugated panel absorbs the light and heat of the sun respectively during the day, and simultaneously obtains the first electric energy and heat source, and uses the first electric energy to supply the required electric energy of the above-mentioned heat pump, the first water pump, the second water pump, the DC heating steam nozzle and the atomizer, and the first heat source provides the heat pump to generate hot water, then uses the steam to drive the steam turbine engine to generate the second electrical energy; at the same time, the residual steam generated by the steam turbine engine passes through the vacuum venturi tube to generate vacuum force on the atomizer, thereby achieving the effect of vacuum atomization refrigeration. Therefore, the present invention uses "light energy" and "thermal energy" to complement and multiply each other, so no matter during the day or night, one can enjoy new green energy and energy-saving air conditioners and achieve goal of net zero.

DETAILED DESCRIPTION OF THE PREFERRED EMBODIMENT

Figure 1:
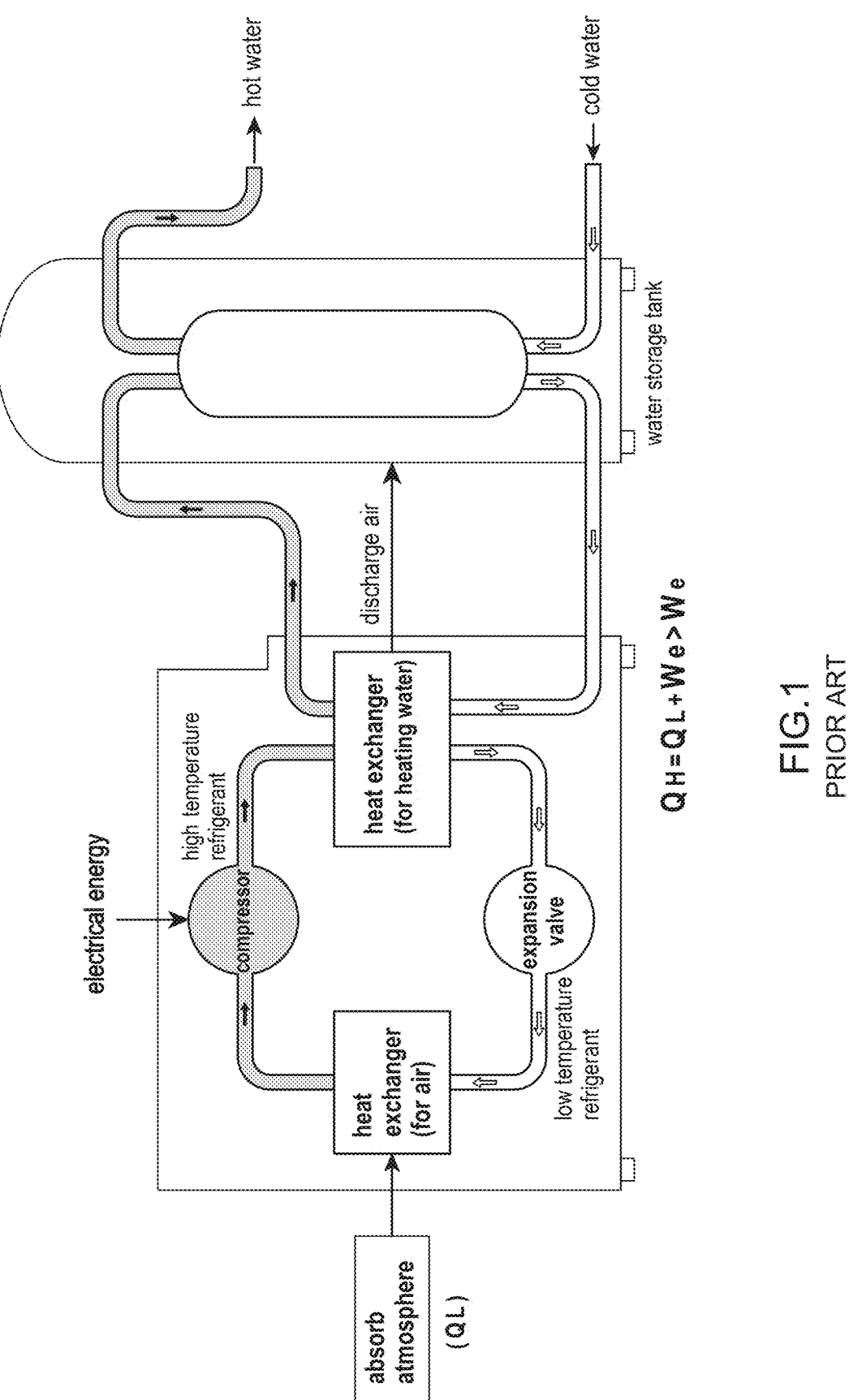
FIG. 1 is a schematic diagram of the conventional heat pump using the thermal cycle principle of the compressor (Rankine cycle) to generate heat transfer.
Figure 2:
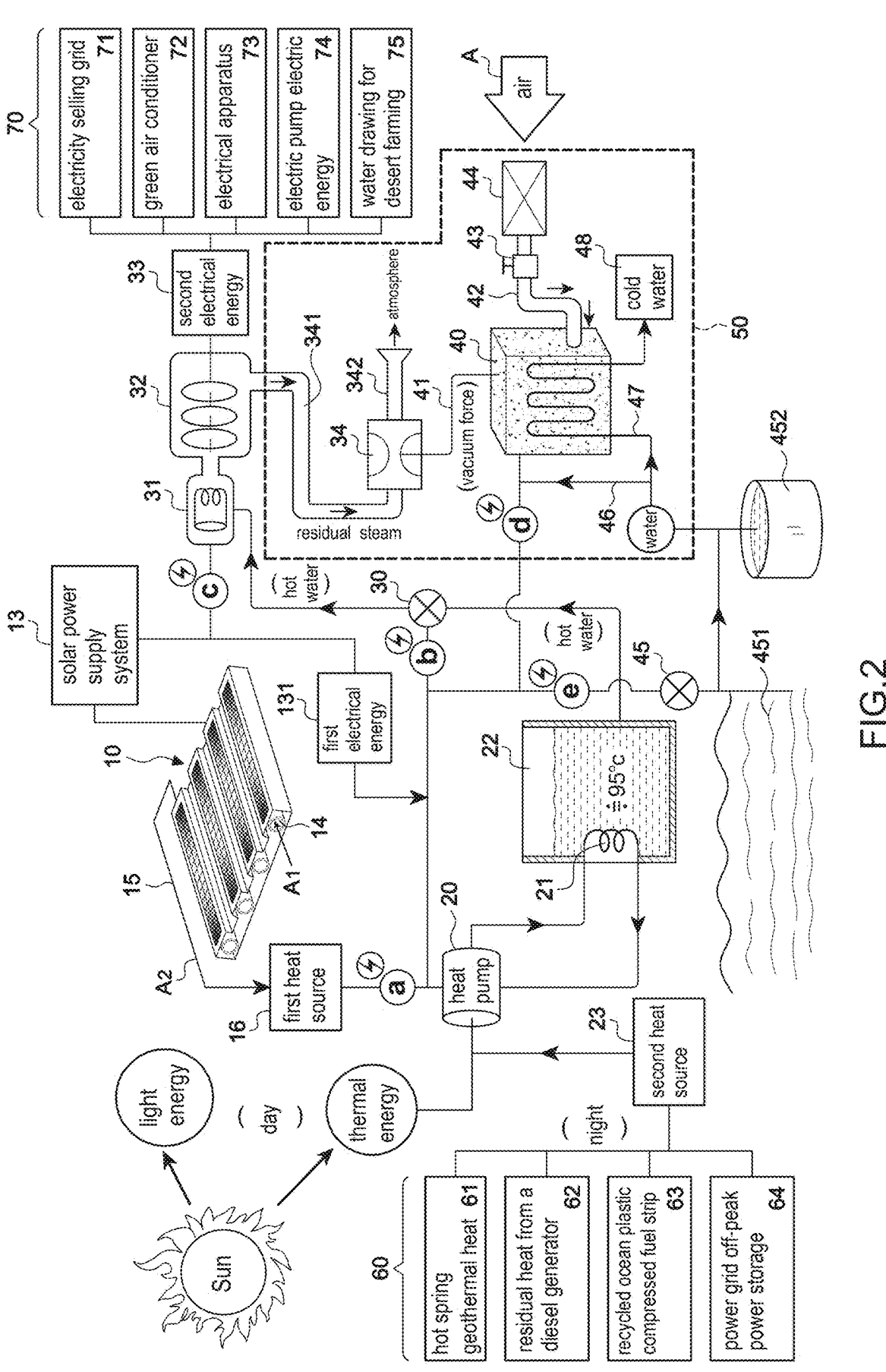
FIG. 2 is a schematic diagram showing the structure of a preferred embodiment of the energy-saving air conditioner converted from green energy of the present invention.

Referring to FIGS. 2~4, a preferred embodiment of the present invention includes: a light and heat composite energy-collecting corrugated panel 10, arranged on a building, as FIG. 3 showing, the light and heat composite energy-collecting corrugated panel 10 has a corrugated panel 11 and a plurality of solar cells 12 on the surface of the corrugated panel 11 for converting solar energy into electrical energy and storing the electrical energy in a solar power supply system 13 to provide a first electrical energy 131. The bottom of the corrugated panel 11 is provided with a plurality of heat collecting tubes 14, the outer end of each heat collecting tube 14 has an air inlet 141; The air inlet 141 is used for letting an external air (A1) to flow in. Since the surface of the corrugated panel 11 is irradiated by sunlight, a high temperature will be formed on the bottom surface, so the external air (A1) flowing in from the heat collecting tubes 14 will become heated air (A2).

A heated air collecting tube 15 connected to the inner end of each heat collecting tube 14 for collecting the heated air (A2) of each heat collecting tube 14, then forms a first heat source 16; therefore, the light and heat composite energy-collecting corrugated panel 10 can simultaneously absorb the "thermal energy" and "light energy" of sunlight during the day, the upper surface provides the solar cells 12 to generate electricity, and the bottom turns the external air (A1) into heated air (A2) to become the first heat source 16. However, the above-mentioned solar cells 12 and the solar power supply system 13 are mature products and belong to prior art, so they are not disclosed in detail.

Figures 3A, 3B:
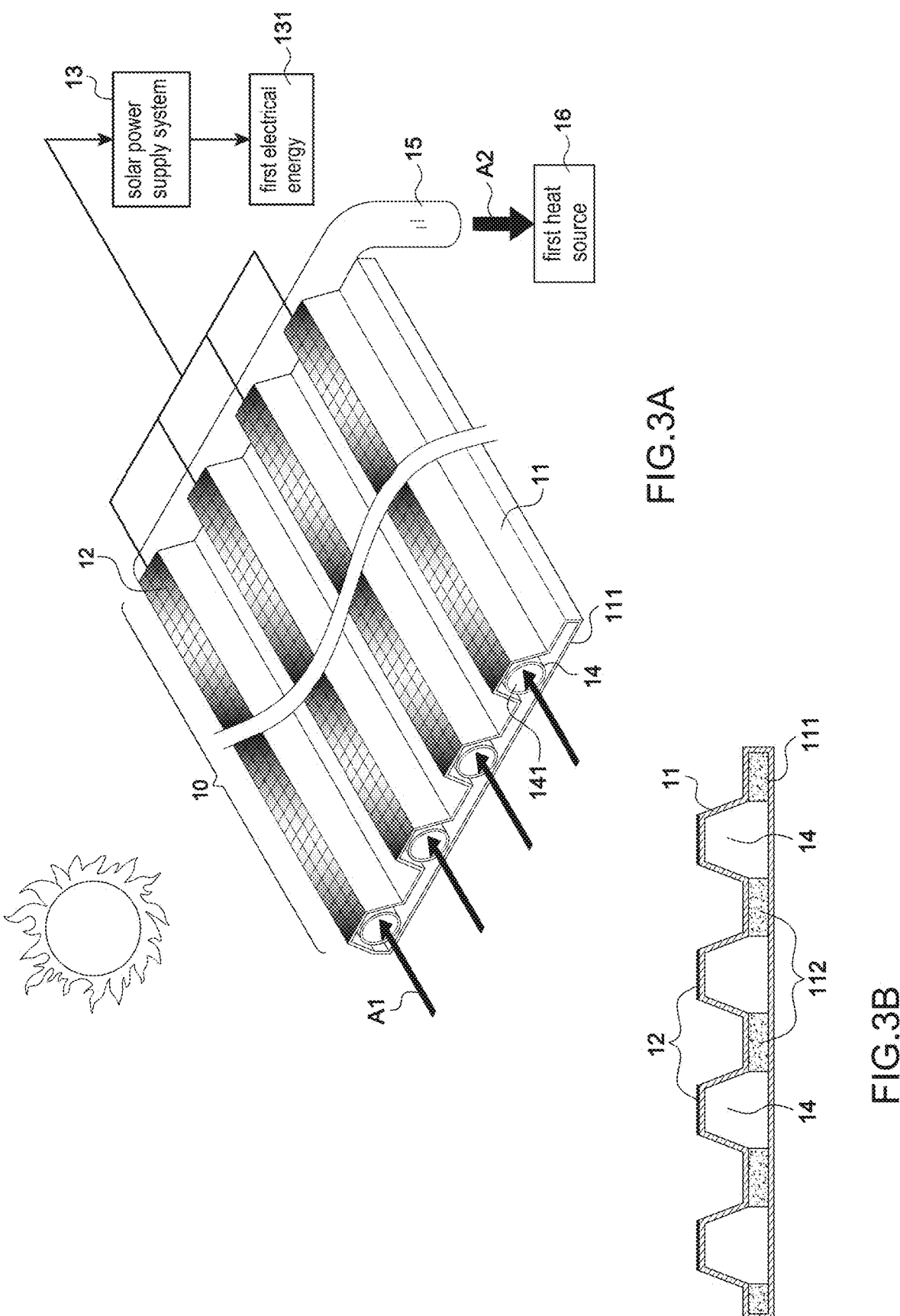
FIG. 3A is a schematic diagram showing the structure of the light and heat composite energy-collecting corrugated panel of the present invention; energy of the present invention.
FIG. 3B is a schematic diagram showing the structure of the heat collecting tube of the present invention.

In this embodiment, the heat collecting tube 14 can be composed of the tube body arranged at the bottom of the corrugated panel 11, or a base plate 111 provided at the bottom of the corrugated panel as FIG. 3B showing, which is sealed by a colloid 112 with interval, thereby directly forming a plurality of side-by-side heat collecting tubes 14.

A heat pump 20, which is powered by the first electrical energy 131 generated by the solar power supply system 13, the heat pump having one end connected to the first heat source 16 formed by the heated air of the heated air collecting tube 15, and the other end sends the heated air to a heat exchanger 21 to heat an underground thermal insulation hot water storage tank 22, then the water stored in the underground thermal insulation hot water storage tank is heated; The heat pump uses the thermal cycle principle of the compressor (Rankine cycle) to generate heat transfer. And it reaches QH=QL+WE>WE, which has economic benefits. Therefore, the present invention provides the heat energy collected by the light and heat composite energy-collecting corrugated panel 10 to the heat pump 20 (QL). Furthermore, the power required by the heat pump 20 can be the first electric energy 131 generated by the solar power supply system 13. In this way, the heat pump 20 uses the "light energy" and "thermal energy" of sunlight to operate, which is a "new green energy" with multiple benefits such as environmental protection, energy saving, and carbon reduction. In this embodiment, the heat exchanger 21 includes a water pump 211 and a pressure relief valve 212.

A first water pump 30, which is powered by the first electrical energy 131 generated by the solar power supply system 13, for delivering the hot water in the underground thermal insulation hot water storage tank 22 to a DC heating steam nozzle 31, and the power required by the DC heating steam nozzle 31 is provided by the solar power supply system 13; as FIG. 4 showing, the hot water 221 of the underground thermal insulation hot water storage tank 22 is generated by using the "light energy" and "thermal energy" of the sunlight above mentioned. This hot water can not only be used for bathing 222, acts like a water heater. Furthermore, can also be provided for power generation 223.

Referring to FIG. 2, a steam turbine engine 32 connected to the DC heating steam nozzle 31, is driven by steam to generate a second electrical energy 33. A vacuum venturi tube 34 connected to the steam turbine engine 32 with an input pipe 341, so that the residual steam generated by the steam turbine engine 32 passes through the vacuum venturi tube 34 and is sent to the atmosphere through an output pipe 342.

An atomizer 40, which is powered by the first electrical energy 131 generated by the solar power supply system 13, the atomizer 40 is a closed container, the upper end of the atomizer 40 is connected to the vacuum venturi tube 34 to generate a vacuum force, and the other end is provided with an air input pipe 42 to introduce external air (A) into the atomizer 40; In this embodiment, the air input pipe 42 may include a regulating valve 43 and a filter 44.

A second water pump 45, which is powered by the first electrical energy 131, for supplying an external water source into the atomizer 40 through a first water pipe 46 for atomization. In this embodiment, the external water source supplied by the second water pump 45 includes a desert groundwater 451 or a water storage tank 452.

A second water pipe 47, after entering the internal circulation of the atomizer 40, produces a cold water 48 flow out, then forming a vacuum atomization refrigeration heat exchanger 50; In this embodiment, the vacuum atomization refrigeration heat exchanger 50 atomizes the input water into fine molecules in the atomizer 40 by using the external air, and uses the vacuum venturi tube 34 to generate vacuum force on the atomizer 40 to make a low temperature zone, whereby the second water pipe 47 enters the atomizer 40 circulation and forms a cold water 48 flow out. Therefore, the cold water 48 is the green energy and green air conditioner derived from the first electrical energy 131 and the first heat source 16 generated by the light and heat of the sun. That is to say, the acquisition of the cold water 48 is from a renewable energy source, which also contributes to the achievement of net-zero carbon emissions.

Wherein the light and heat composite energy-collecting corrugated panel 10 absorbs the light and heat of the sun respectively during the day, and simultaneously obtains the first electric energy 131 and first heat source 16, and uses the first electric energy 131 to supply the required electric energy of the above-mentioned heat pump 20, the first water pump 30, the second water pump 45, the DC heating steam nozzle 31 and the atomizer 40, so as to achieve using regenerated electric energy to supply the electric energy required by various indoor electrical equipment; and the first heat source 16 provides the heat pump 20 to generate hot water 221, then uses the steam to drive the steam turbine engine 32 to generate the second electrical energy 33; at the same time, the residual steam generated by the steam turbine engine 32 passes through the vacuum venturi tube 34 to generate vacuum force on the atomizer 40, thereby achieving the effect of vacuum atomization refrigeration.

With the features disclosed above, as FIG. 2 showing, the heat pump 20 can also provide a second heat source 23 at night by an auxiliary heat source generating device 60, the auxiliary heat source generating device 60 includes: a hot spring geothermal heat 61, a residual heat from a diesel generator 62, a recycled ocean plastic compressed fuel strip 63, and a power grid off-peak power storage 64.

Also, the second electrical energy 33 is provided for an electric device 70, the electric device 70 includes: an electricity selling grid 71, a green air conditioner 72, an electrical apparatus 73, an electric pump electric energy 74, and a water drawing for desert farming 75.

Figure 4A:
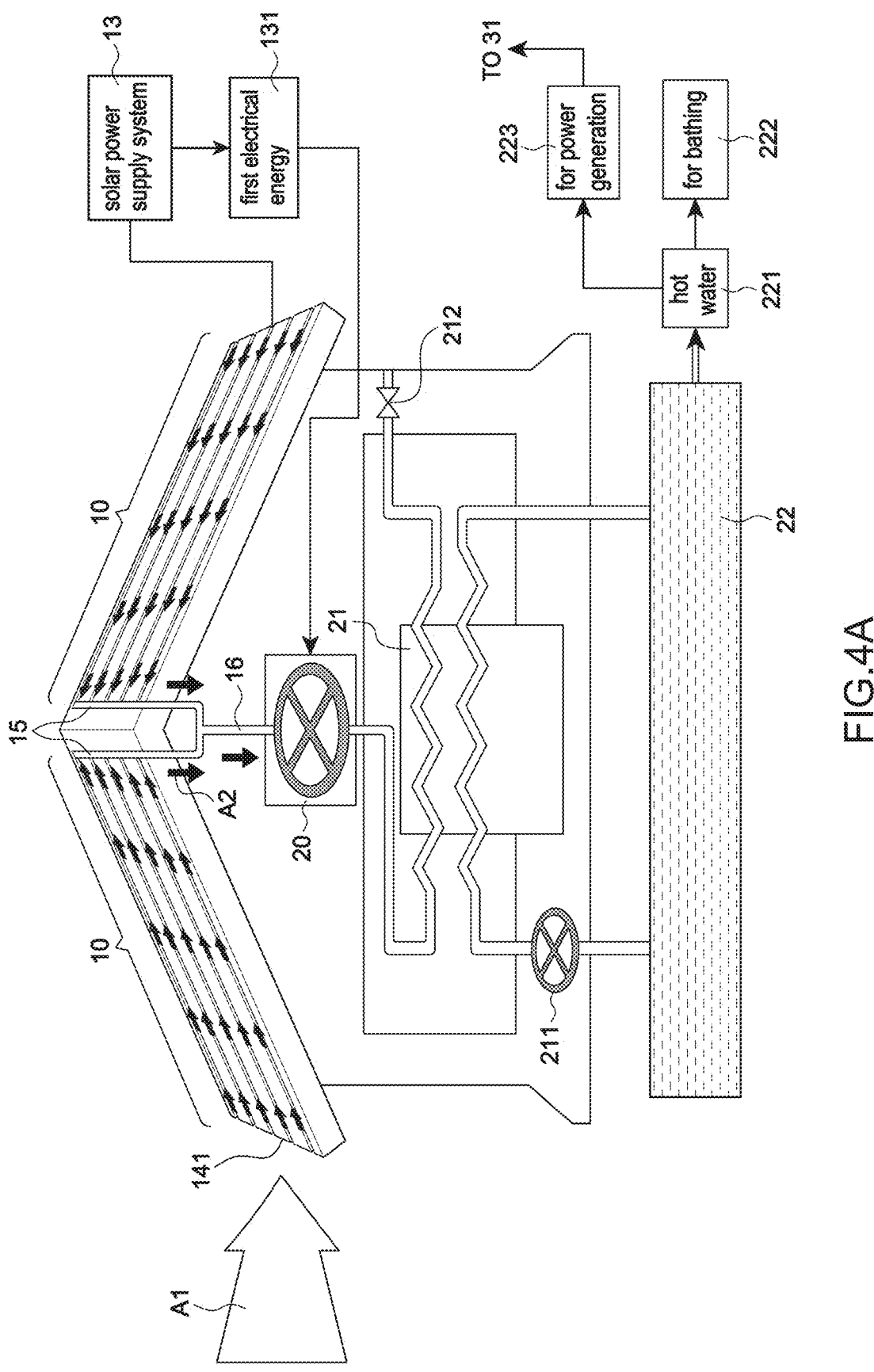
FIG. 4A is a schematic diagram showing the heat collection and energy generation of the light and heat composite energy-collecting corrugated panel of the present invention.
Figure 4B:
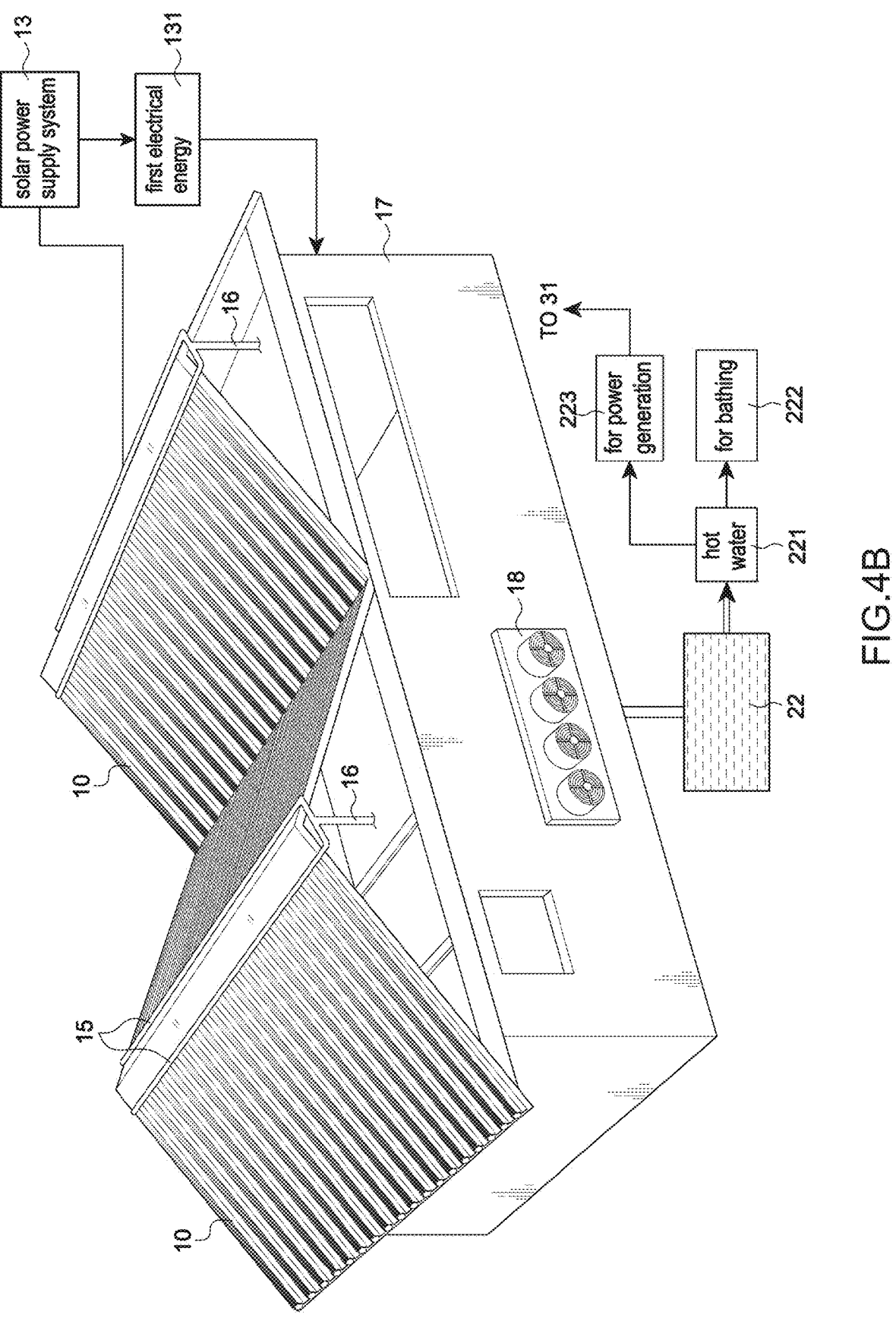
FIG. 4B is a schematic diagram showing the application of the energy-saving air conditioner converted from green energy of the present invention.

Further referring to FIG. 4A, which is a schematic diagram showing arrangement on the roof of the light and heat composite energy-collecting corrugated panel 10, thereby generating a new green energy conversion structure of the first electrical energy 131 and the first heat source 16, so that an energy-saving air conditioner with new green energy conversion as showing in FIG. 2 can be achieved. Further referring to FIG. 4B, which discloses an embodiment of the present invention, the light and heat composite energy-collecting corrugated panel 10 is installed on the roof of a livestock breeding house 17. Since the general livestock breeding house 17 has a large area, the light and heat composite energy-collecting corrugated panel 10 installing area will be relatively large, and the first electrical energy 131 and the first heat source 16 generated are sufficient. In this way, the power required for various indoor equipment in the livestock breeding house 17, including lighting, heat pumps or air conditioning, exhaust gas and sewage elimination equipment, etc., can all be supplied by the first electrical energy 131 and the first heat source 16 provided by the new green energy conversion structure of the light and heat composite energy-collecting corrugated panel 10, so it has economic and environmental benefits. And it can also further promote a negative pressure air conditioning equipment 18 or high temperature plasma combustion power generation and other equipment, etc.

Moreover, the light and heat composite energy-collecting corrugated panel 10 absorbs the light and heat of the sun respectively during the day, and simultaneously obtains the first electric energy 131 and first heat source 16, and uses the first electric energy 131 to supply indoor green energy equipment to generate a second electrical energy 33; at the same time, the residual steam generated by the steam turbine engine 32 passes through the vacuum venturi tube 34 to generate vacuum force on the atomizer 40, thereby achieving the effect of vacuum atomization refrigeration, then forming a vacuum atomization refrigeration heat exchanger 50, then produces a cold water 48 flow out; This cold water 48 can be provided for the air-conditioning device, so that the livestock raised in the livestock breeding house 17 can have air-conditioning, forming a friendly breeding ecology chain. Furthermore, the heat pump 20 can also provide a second heat source 23 at night by an auxiliary heat source generating device 60. Therefore, the present invention absorbs the light and heat of the sun respectively during the day, so that no matter whether it is day or night can have the benefits of new green energy air conditioning, helping to achieve the goal of net-zero carbon emissions.

Figure 4C:
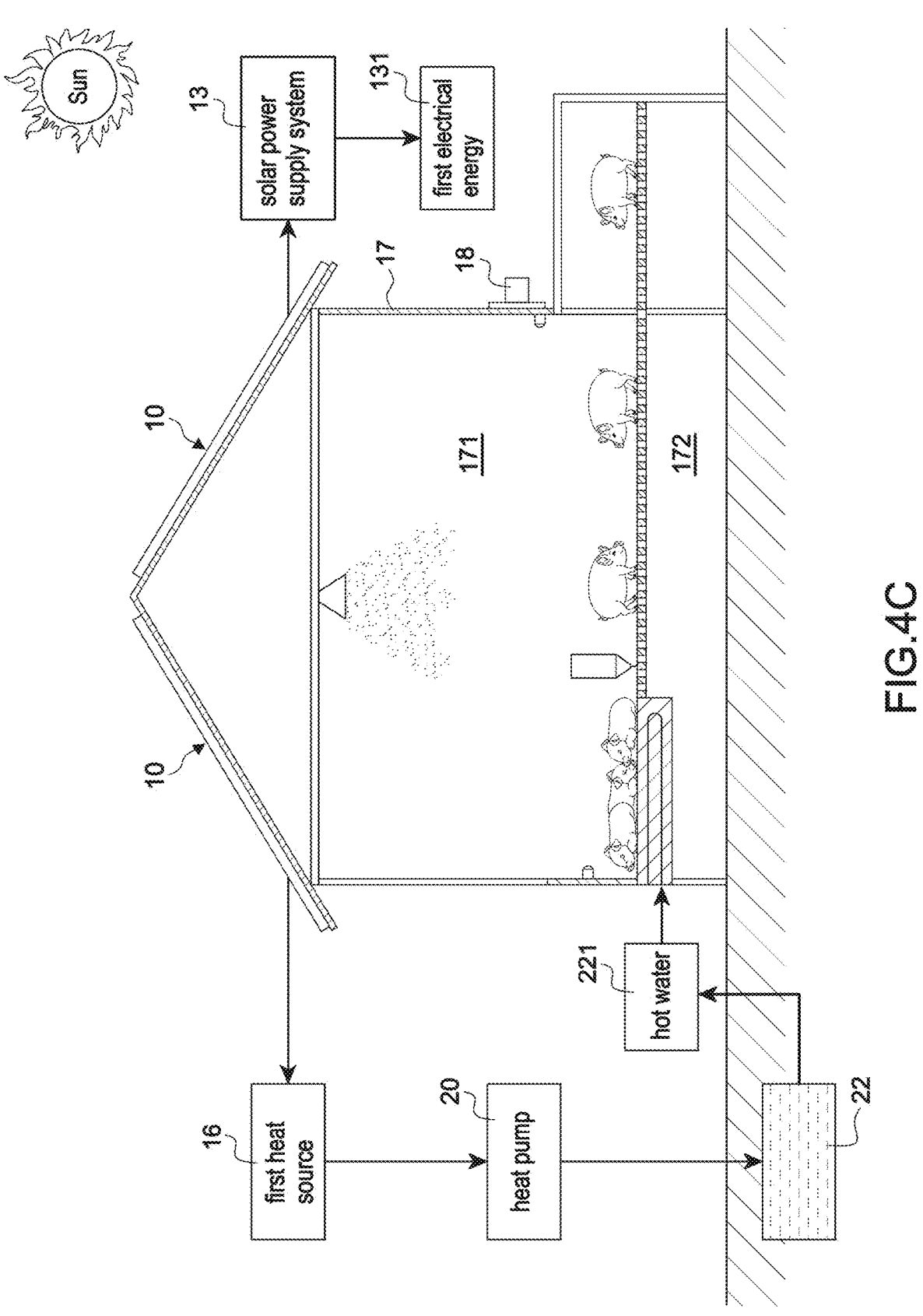
FIG. 4C is a schematic diagram showing the application in livestock breeding house of the energy-saving air conditioner converted from green energy of the present invention.
Figure 4D:
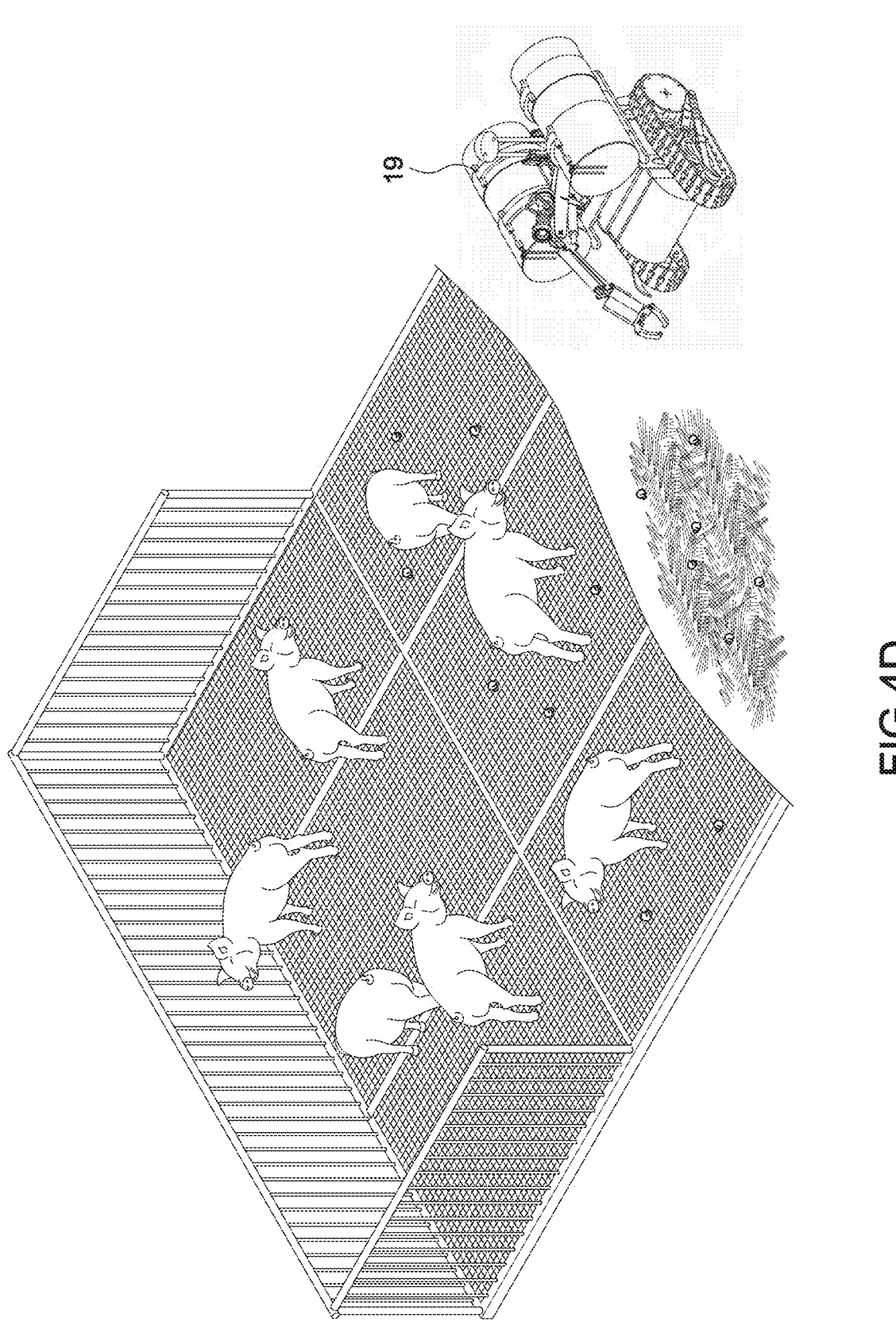
FIG. 4D is a schematic diagram showing the application of an intelligent sawdust paving and urine paving material recycling electric car.

Further referring to FIGS. 4C and 4D, which are schematic diagrams showing the roof of the livestock breeding house 17 absorbs the light and heat of the sun during the day, and simultaneously obtains the first electrical energy 131 and the first heat source 16, which are then provided to the indoor green energy equipment to generate the second electrical energy 33; And further make the livestock breeding house 17 to be a friendly breeding house. The friendly breeding house includes a negative pressure air conditioning equipment 18 and a processing system for recycling organic waste, the livestock breeding house 17 at least includes an upper floor breeding area 171 and a fermentation area 172 below the breeding area; Moreover, As FIG. 4D showing an intelligent sawdust paving and urine paving material recycling electric car 19, which can lay dry rice and wood chips on the floor, and drop all residual urine into the fermentation area 172 through the meshes in the activity area. Wooden biochar can be added to the fermentation area 172 to form low-odor compost from organic recycling waste, and then the recycling electric car 19 to recycle. Moreover, using livestock waste and wood chips plus high-temperature thermite to generate electricity to drive negative pressure air conditioners, promote high-temperature plasma combustion to generate electricity, and eliminate waste gas emissions, etc. Therefore, the livestock breeding house 17 can achieve the benefits of friendly breeding through new green energy-air conditioning and intelligent recycling processing.

Figure 5A:
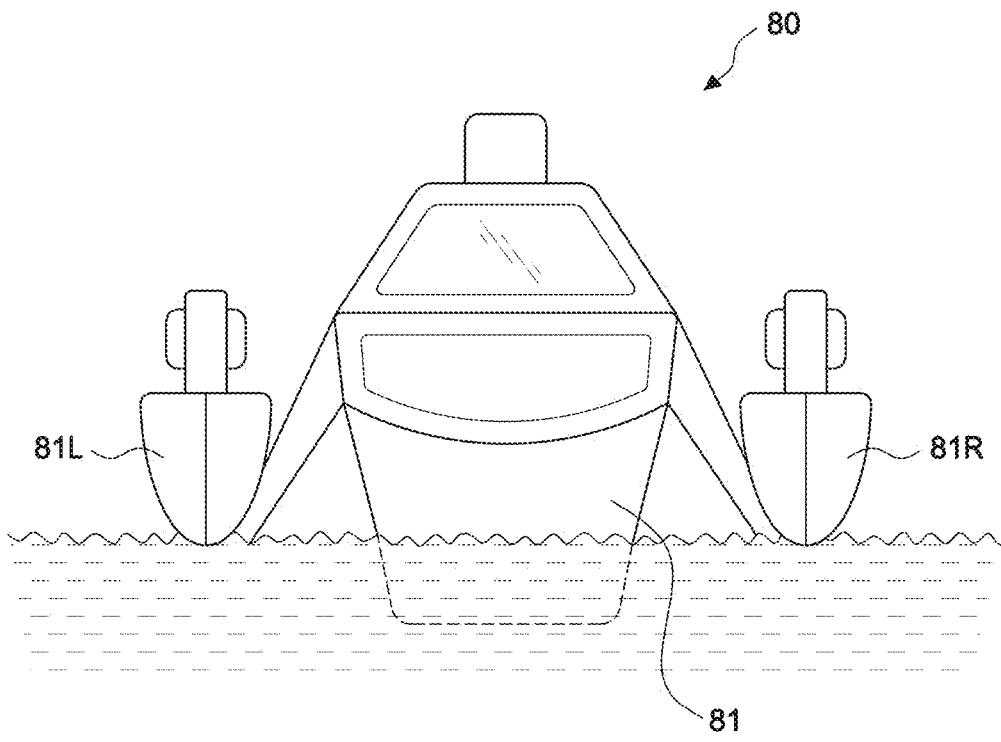
FIG. 5A is a front view of the automatic ocean plastic cleaning ship.
Figure 5B:
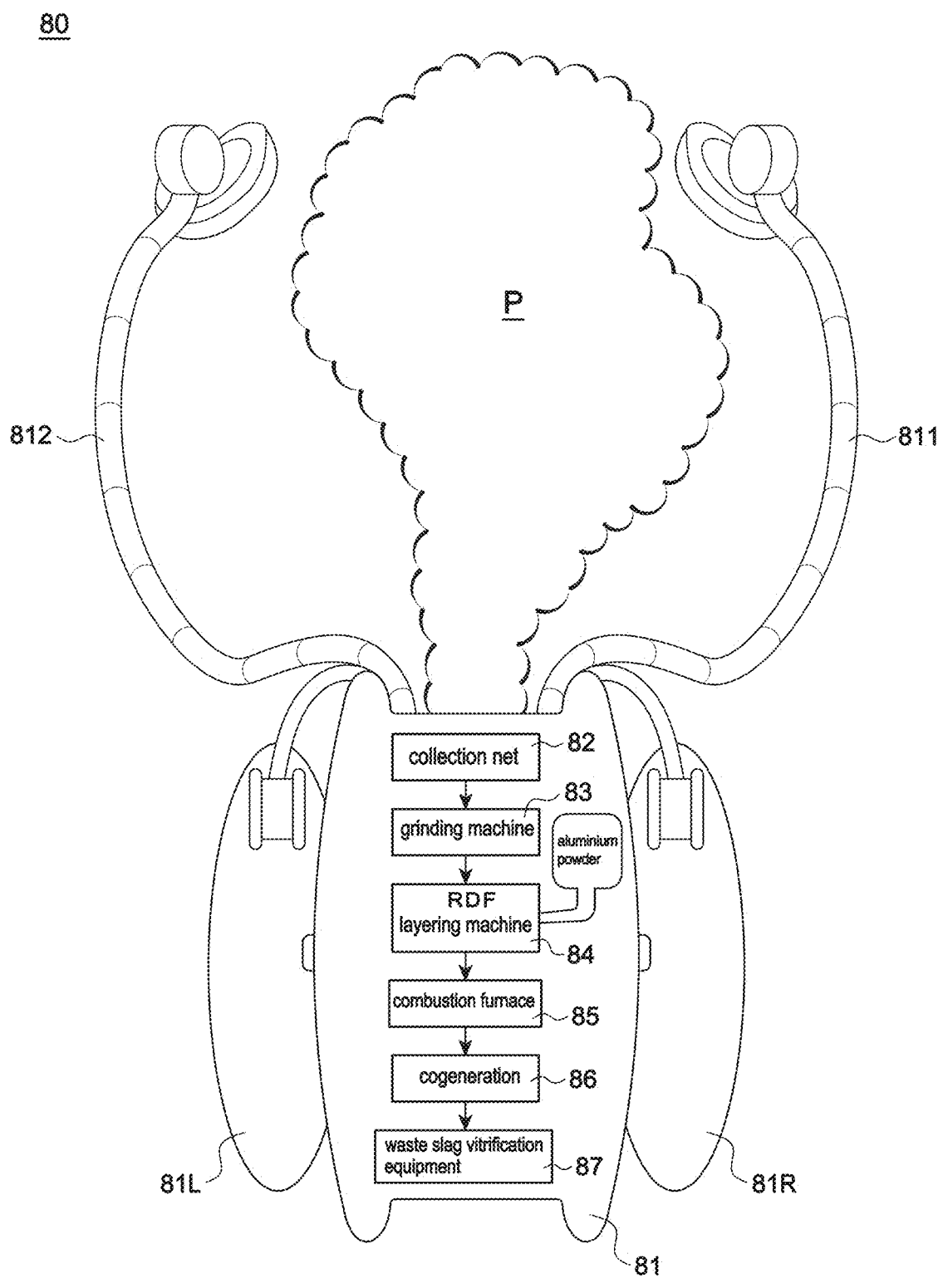
FIG. 5B is a top view of the automatic ocean plastic cleaning ship.

Referring to FIGS. 5A and 5B, the above-mentioned recycled ocean plastic compressed fuel strips 63 can be manufactured by an automatic ocean plastic cleaning ship 80, the automatic ocean plastic cleaning ship 80 includes: a working mother ship 81, a right hull 81R, a left hull 81L, a right automatic plastic collecting cable ship 811, and a left automatic plastic collecting cable ship 812; the working mother ship 81 is equipped with a collection net 82, a grinding machine 83, a layering machine 84, a combustion furnace 85, a cogeneration 86 and a waste slag vitrification equipment 87; through the left and right automatic plastic collecting cable ship 811, 812 collects the plastic clumps (P) drifting in the ocean and sends them to the working mother ship 81 for processing to make the recycled ocean plastic compressed fuel strips 63. Not only can it remove pollution sources on the ocean, but it can also create renewable energy and contribute to net-zero carbon emissions.

Figure 6A:
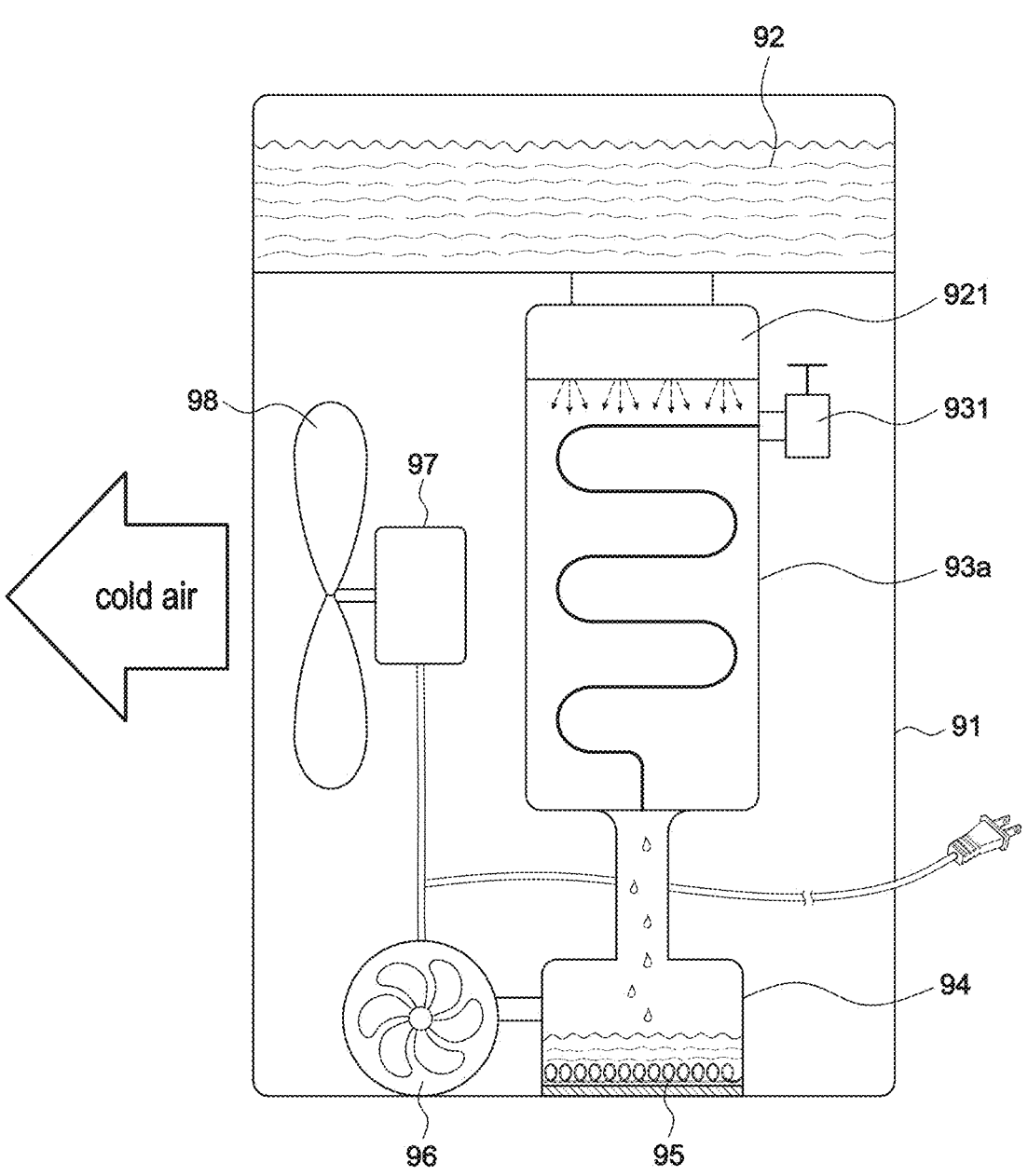
FIG. 6A is a schematic diagram showing a water mist vacuum heat-absorbing cooling fan.
Figure 6B:
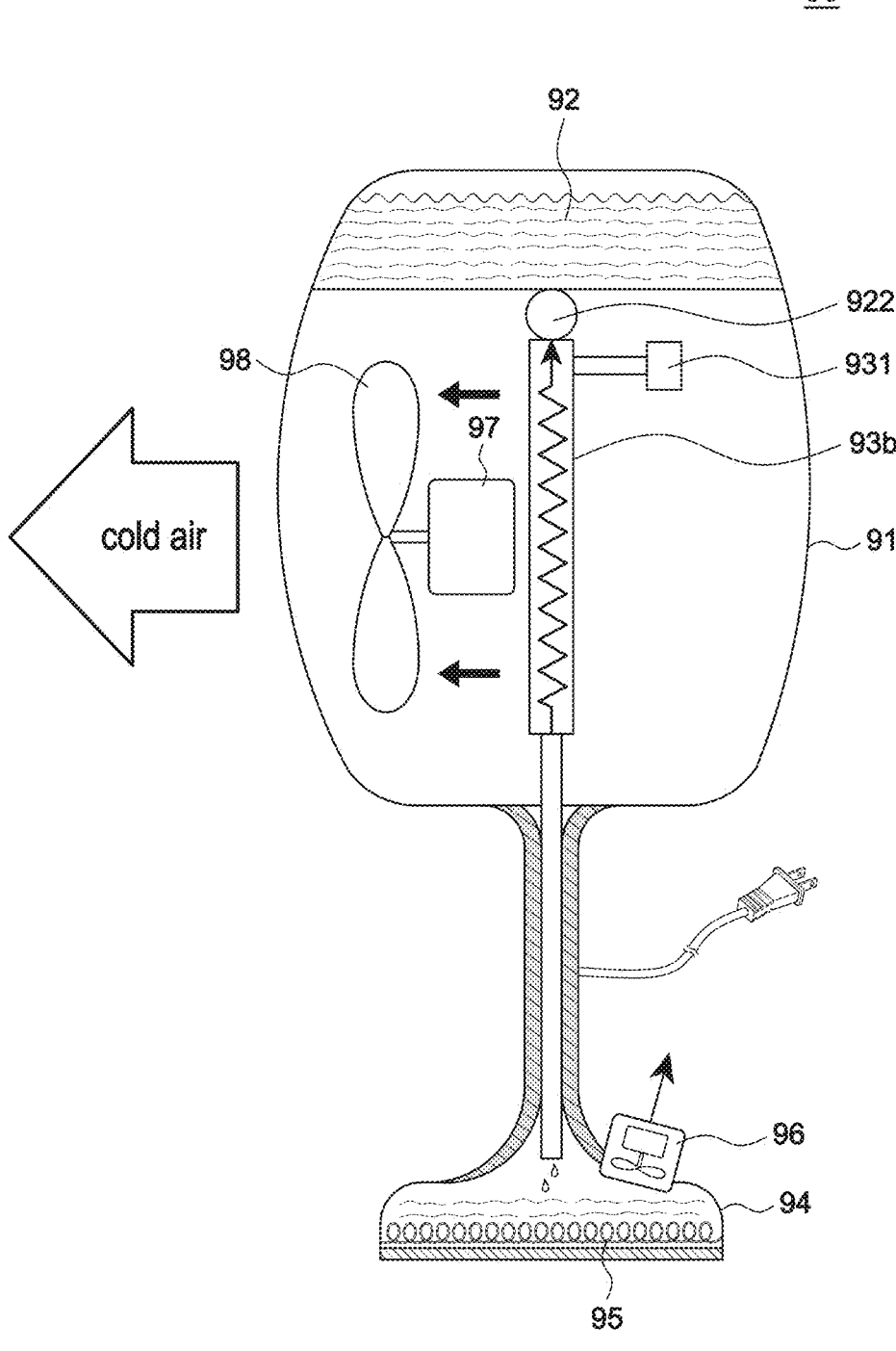
FIG. 6B is a schematic diagram showing another water mist vacuum heat-absorbing cooling fan.

Referring to FIGS. 6A and 6B, the vacuum atomization refrigeration heat exchanger 50 can be made into the form of a water mist vacuum heat-absorbing cooling fan 90. FIG. 6A discloses a water mist vacuum heat-absorbing cooling fan 90, including: a shell 91, a water tank 92 provided at the top of the shell 91, and a water atomizer 921 provided below the water tank 92; a heat exchanger 93a arranged below the water atomizer 921, the heat exchanger 93a is connected to an air inlet negative pressure valve 931; a residual water collection container 94 arranged below the heat exchanger 93a; an electric heating wire 95 on the inner edge of the bottom of the residual water collection container 94 to heat the residual water; a vacuum exhaust fan 96 connected to the residual water collection container 94 to discharge heated air; a fan motor 97 installed on one side of the heat exchanger 93a to drive a blade 98 to rotate and discharge cold air.

FIG. 6B discloses another water mist vacuum heat-absorbing cooling fan 90, the structures that are the same as the previous embodiment are represented by the same figure numbers, the difference between are: the water atomizer 921 switch to a pump 922, the heat exchanger 93a switch to a vacuum endothermic heat exchanger 93b; And the vacuum exhaust fan 96 can be composed of a vacuum vortex fan.

Figure 7A:
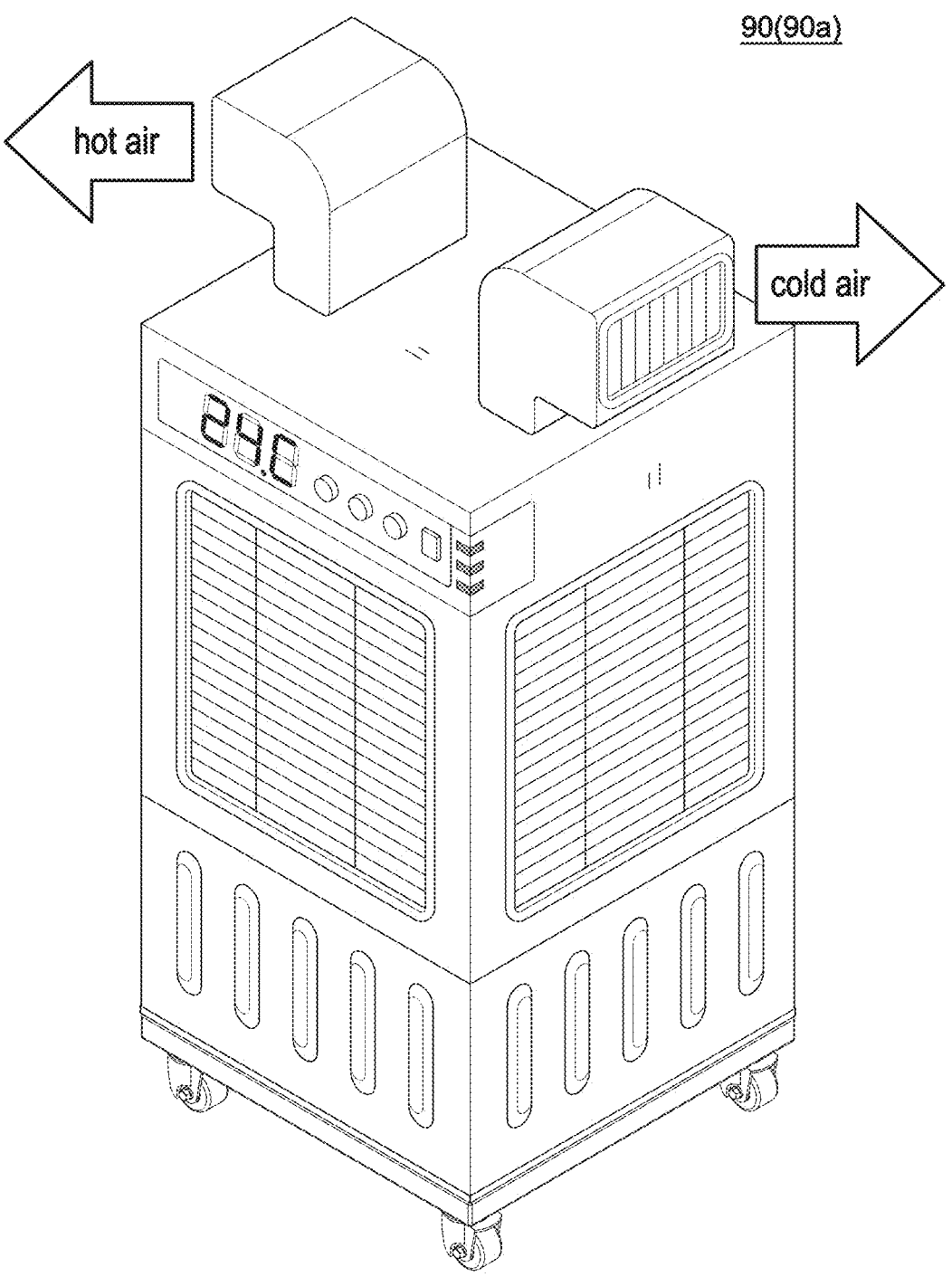
FIG. 7A is a perspective view of an atomizing cooling fan with built-in spherical vortex device.
Figure 7B:
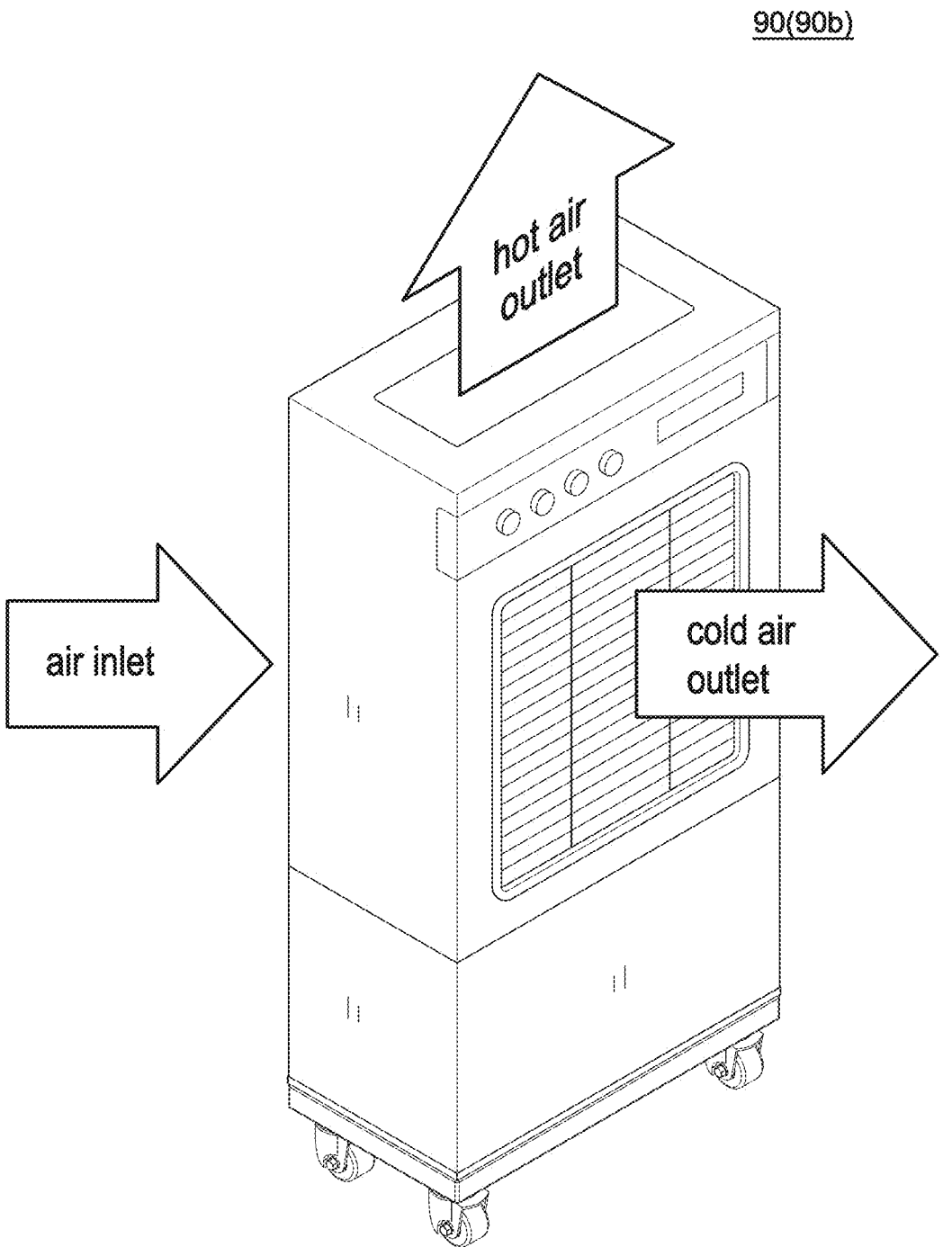
FIG. 7B is a perspective view of an atomizing cooling fan with built-in flat plate vortex device.
Figure 8A:
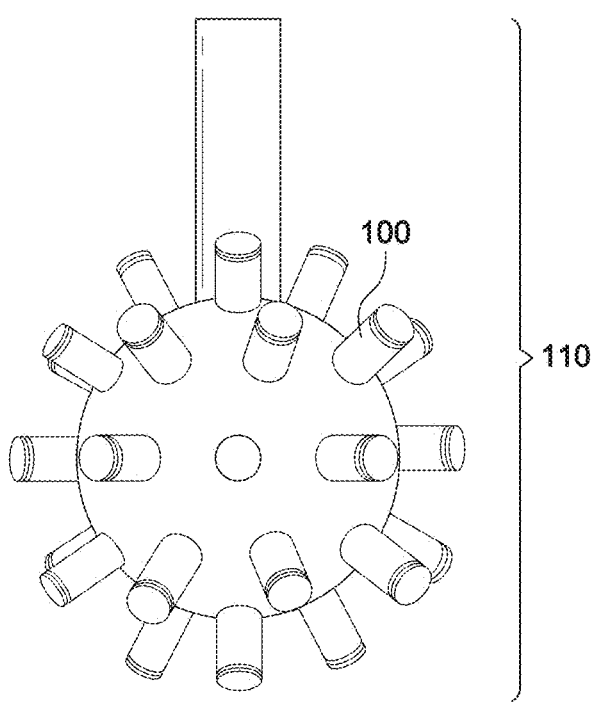
FIG. 8A is a schematic diagram showing the structure of a vortex tube.
Figure 8B:
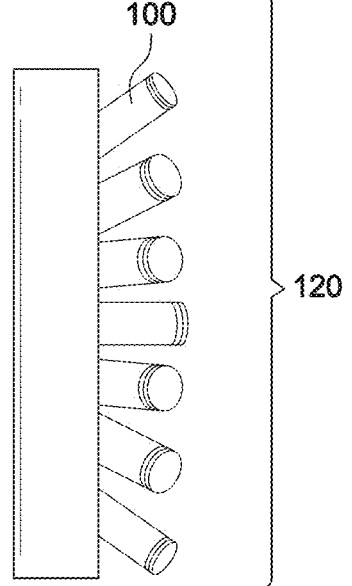
FIG. 8B is a schematic diagram showing the structure of a spherical vortex device.
Figure 8C:
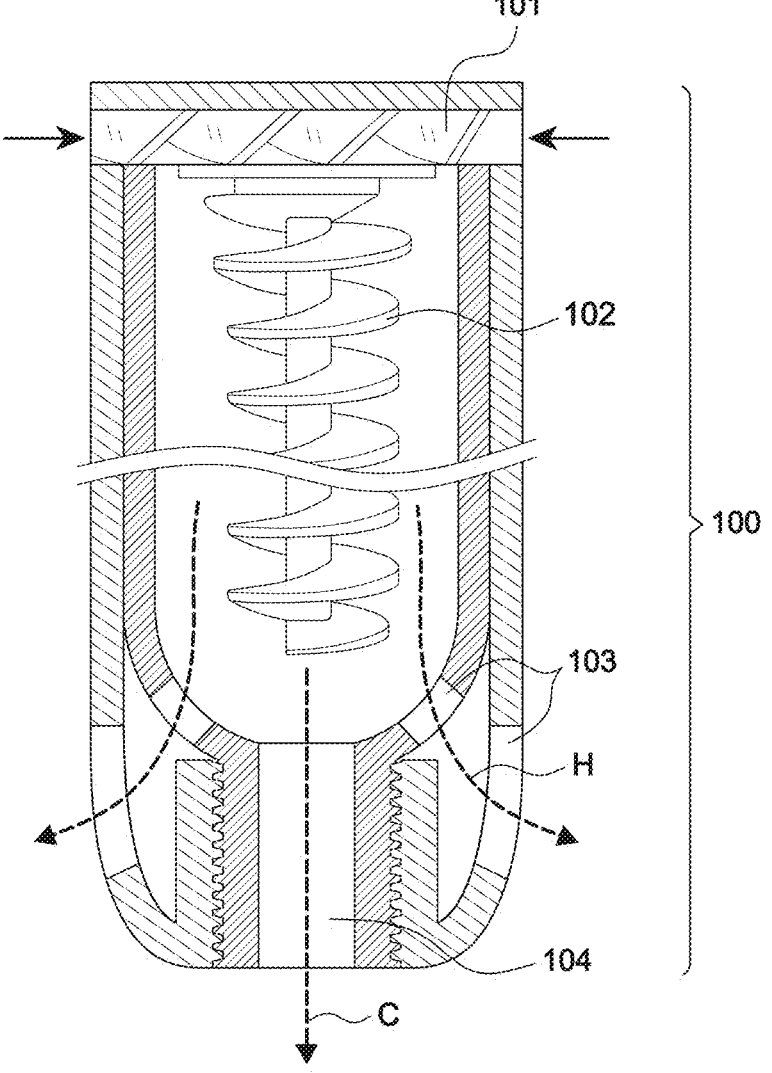
FIG. 8C is a schematic diagram showing the structure of a flat plate vortex device.

FIG. 7A discloses an atomizing cooling fan with built-in spherical vortex device 90a; FIG. 7B discloses an atomizing cooling fan with built-in flat plate vortex device 90b; These models are based on the structure of the above-mentioned water mist vacuum heat-absorbing cooling fan 90 and are further enhanced. FIG. 8A discloses a spherical vortex device 110 on FIG. 7A. FIG. 8B discloses a flat plate vortex device 120 on FIG. 7B. The vortex device 110, 120 is formed by multiple vortex tubes 100. As FIG. 8C showing, the vortex tubes 100 have an inclined crosswind inlet blade arranged at the top, a vortex generator 102 arranged at the middle, a hot air outlet 103 arranged at the bottom periphery, and a cold air outlet 104 arranged at the bottom end. In this embodiment, using the mechanism of the hot and cold separation effect of the vortex tube 100, since the high-pressure gas flowing into the vortex tube 100 has pressure energy, its adiabatic expansion process will convert the pressure energy into kinetic energy of the gas, however, the operation of the vortex tube belongs to prior art, so will not be mentioned in detail here. The present invention uses the principle of the vortex tube 100 to achieve the atomizing cooling fan with built-in flat plate vortex device 90a or the atomizing cooling fan with built-in flat plate vortex device 90b to have the function of separating hot and cold water mist.

Figure 7C:
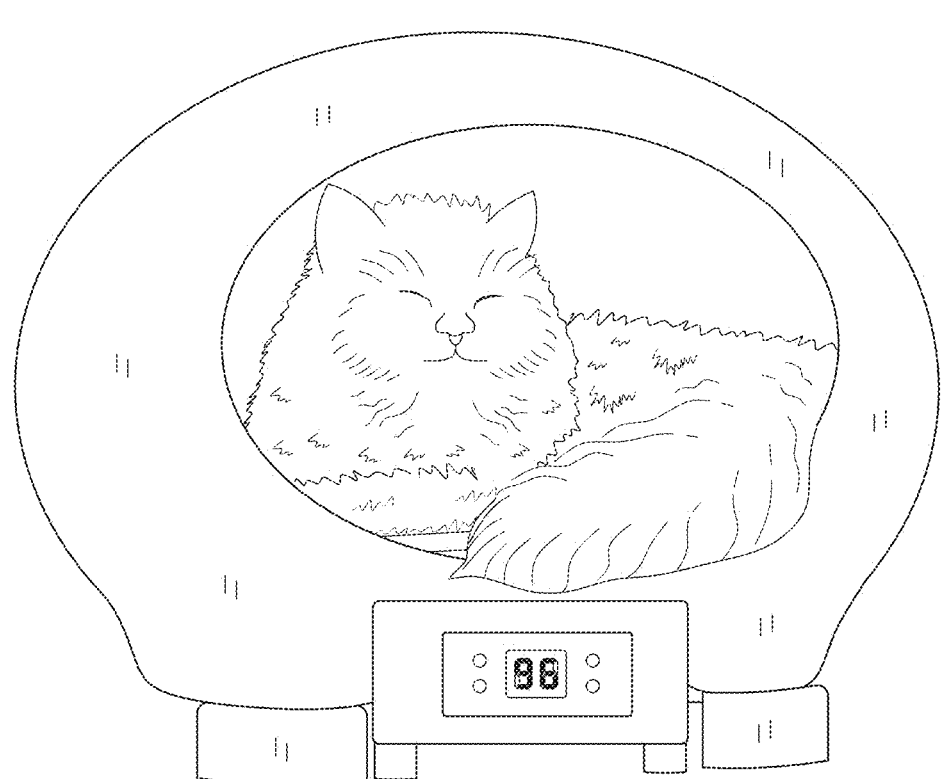
FIG. 7C is a perspective view of an air-conditioned pet house.

And with these features, an air-conditioned pet house 90c can be made, as showing in FIG. 7C. The left leg is the air inlet, the right leg is the hot air outlet, and in the middle are the monitor, the water storage and mist spraying device. The mechanism in FIGS. 6A to 8C are extended products using the technical means of the vacuum atomization refrigeration heat exchanger 50.

Whereby, the light and heat composite energy-collecting corrugated panel 10 absorbs the light and heat of the sun respectively during the day, and simultaneously obtains the first electric energy 131 and first heat source 16, and uses the first electric energy 131 to supply indoor green energy equipment to generate a second electrical energy 33; at the same time, the residual steam generated by the steam turbine engine 32 passes through the vacuum venturi tube 34 to generate vacuum force on the atomizer 40, thereby achieving the effect of vacuum atomization refrigeration, then forming a vacuum atomization refrigeration heat exchanger 50, Furthermore, the heat pump 20 can also provide a second heat source 23 at night by an auxiliary heat source generating device 60. Therefore, the present invention absorbs the light and heat of the sun respectively during the day, so that no matter whether it is day or night can have the benefits of new green energy air conditioning, helping to achieve the goal of net-zero carbon emissions.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An energy-saving air conditioner converted from green energy, including:

a light and heat composite energy-collecting corrugated panel, arranged on a building, wherein the light and heat composite energy-collecting corrugated panel has a corrugated panel and a plurality of solar cells on the surface of the corrugated panel for converting solar energy into electrical energy and storing the electrical energy in a solar power supply system to provide a first electrical energy, the bottom of the corrugated panel is provided with a plurality of heat collecting tubes, the outer end of each heat collecting tube has an air inlet;

a heated air collecting tube connected to the inner end of each heat collecting tube for collecting the heated air of each heat collecting tube, then forming a first heat source;

a heat pump, which is powered by the first electrical energy, wherein the heat pump has one end connected to the first heat source, and the other end sends the heated air to a heat exchanger to heat an underground thermal insulation hot water storage tank, then the water stored in the underground thermal insulation hot water storage tank is heated;

a first water pump, which is powered by the first electrical energy, for delivering the hot water in the underground thermal insulation hot water storage tank to a DC heating steam nozzle, and the power required by the DC heating steam nozzle is provided by the first electrical energy;

a steam turbine engine connected to the DC heating steam nozzle, is driven by steam to generate a second electrical energy;

a vacuum venturi tube connected to the steam turbine engine with an input pipe, so that the residual steam generated by the steam turbine engine passes through the vacuum venturi tube and is sent to the atmosphere through an output pipe;

an atomizer, which is powered by the first electrical energy, the atomizer is a closed container, the upper end of the atomizer is connected to the vacuum venturi tube to generate a vacuum force, and the other end is provided with an air input pipe to introduce external air into the atomizer;

a second water pump, which is powered by the first electrical energy, for supplying an external water source into the atomizer through a first water pipe for atomization, then through a second water pipe entering the internal circulation of the atomizer; and a vacuum atomization refrigeration heat exchanger, wherein the vacuum atomization refrigeration heat exchanger atomizes the input water into fine molecules in the atomizer by using the external air, and uses the vacuum venturi tube to generate vacuum force on the atomizer to make a low temperature zone, whereby the second water pipe enters the atomizer circulation and forms a cold water flow out;

wherein the light and heat composite energy-collecting corrugated panel absorbs the light and heat of the sun respectively during the day, and simultaneously obtains the first electric energy and heat source, and uses the first electric energy to supply the required electric energy of the above-mentioned heat pump, the first water pump, the second water pump, the DC heating steam nozzle and the atomizer.

2. The energy-saving air conditioner converted from green energy as claimed in claim 1, wherein each of the heat collecting tube is composed of the tube body arranged at the bottom of the corrugated panel, or a base plate provided at the bottom of the corrugated panel, wherein each heat collecting tube is sealed by a colloid with interval, thereby directly forming a plurality of side-by-side heat collecting tubes.

3. The energy-saving air conditioner converted from green energy as claimed in claim 2, wherein the building is a livestock breeding house, and the light and heat composite energy-collecting corrugated panel is installed on the roof of the livestock breeding house.

4. The energy-saving air conditioner converted from green energy as claimed in claim 3, wherein the heat pump also provide a second heat source at night by an auxiliary heat source generating device, the auxiliary heat source generating device includes: a hot spring geothermal heat, a residual heat from a diesel generator, a recycled ocean plastic compressed fuel strip, and a power grid off-peak power storage.

5. The energy-saving air conditioner converted from green energy as claimed in claim 3, wherein the second electrical energy is provided for an electric device, the electric device includes: an electricity selling grid, a green air conditioner, an electrical apparatus, an electric pump electric energy, and a water drawing for desert farming.

6. The energy-saving air conditioner converted from green energy as claimed in claim 1, wherein the external water source supplied by the second water pump includes a desert groundwater or a water storage tank.

\*    \*    \*    \*    \*